United States Patent
Arnold et al.

(10) Patent No.: US 9,703,973 B2
(45) Date of Patent: Jul. 11, 2017

(54) CUSTOMER LOAD OF FIELD PROGRAMMABLE GATE ARRAYS

(71) Applicant: INTERNATIONAL BUSINESS MACHINES CORPORATION, Armonk, NY (US)

(72) Inventors: Todd W. Arnold, Charlotte, NC (US); Mark A. Check, Hopewell Junction, NY (US); Vincenzo Condorelli, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 188 days.

(21) Appl. No.: 14/698,117

(22) Filed: Apr. 28, 2015

(65) Prior Publication Data

US 2016/0321662 A1 Nov. 3, 2016

(51) Int. Cl.
  *G06F 21/62* (2013.01)
  *H04L 9/08* (2006.01)
  *G06Q 20/34* (2012.01)

(52) U.S. Cl.
  CPC .......... *G06F 21/62* (2013.01); *G06F 21/6209* (2013.01); *G06Q 20/341* (2013.01); *G06Q 20/3552* (2013.01); *H04L 9/0822* (2013.01); *G06Q 2220/00* (2013.01); *H04L 2209/24* (2013.01)

(58) Field of Classification Search
  CPC ............... G06F 21/62; G06F 21/6209; G06F 2221/2141; H04L 9/0822; G06Q 20/341; G06Q 20/3552
  See application file for complete search history.

(56) References Cited

U.S. PATENT DOCUMENTS

| 2003/0223585 A1* | 12/2003 | Tardo | H04L 9/3271 380/277 |
| 2004/0030889 A1* | 2/2004 | Chin | H04L 9/0637 713/160 |
| 2004/0059913 A1 | 3/2004 | de Jong | |
| 2004/0088567 A1* | 5/2004 | Lamotte | H04L 63/164 726/13 |

(Continued)

OTHER PUBLICATIONS

Eguro, K., & Venkatesan, R. (Aug. 2012). "FPGAs for trusted cloud computing". In 22nd International Conference on Field Programmable Logic and Applications (FPL) (pp. 63-70). IEEE.*

(Continued)

*Primary Examiner* — Hadi Armouche
*Assistant Examiner* — Sher A Khan
(74) *Attorney, Agent, or Firm* — Steven Chiu, Esq.; Blanche E. Schiller, Esq.; Heslin Rothenberg Farley & Mesiti P.C.

(57) ABSTRACT

Customer content is securely loaded on a field programmable gate array (FPGA) located on a secure cryptography card. The customer content is loaded such that it may not be extracted. A customer obtains a secure cryptography card that includes a field programmable gate array and a master key generated by the secure cryptography card. The customer loads customer specific content on the field programmable gate array, wherein, based on the loading, the customer specific content is secure from extraction via the master key by at least entities other than the customer.

14 Claims, 6 Drawing Sheets

(56) References Cited

U.S. PATENT DOCUMENTS

| | | | |
|---|---|---|---|
| 2006/0059372 A1 | 3/2006 | Fayar et al. | |
| 2007/0168676 A1* | 7/2007 | Fayad | G06F 21/72 713/185 |
| 2008/0270805 A1* | 10/2008 | Kean | G06F 17/5054 713/189 |
| 2009/0147945 A1 | 6/2009 | Doi et al. | |
| 2009/0172401 A1 | 7/2009 | Cizas et al. | |
| 2010/0017627 A1 | 1/2010 | Princen et al. | |
| 2010/0306762 A1 | 12/2010 | Lindberg et al. | |
| 2011/0138192 A1* | 6/2011 | Kocher | G06F 21/602 713/189 |
| 2011/0264926 A1* | 10/2011 | Guthery | G06F 21/606 713/193 |
| 2012/0047371 A1* | 2/2012 | Woodall | G06F 21/76 713/189 |
| 2013/0346758 A1* | 12/2013 | LaMacchia | G06F 21/445 713/190 |
| 2014/0010371 A1 | 1/2014 | Khazan et al. | |
| 2015/0074392 A1 | 3/2015 | Boivie et al. | |
| 2015/0113258 A1* | 4/2015 | Grieco | G06F 21/572 713/2 |
| 2015/0195082 A1 | 7/2015 | Han et al. | |
| 2015/0349969 A1* | 12/2015 | Dworak | H04L 9/3278 380/28 |

OTHER PUBLICATIONS

Trimberger, S. (Jun. 2007). "Trusted design in FPGAs". In Proceedings of the 44th annual Design Automation Conference (pp. 5-8). ACM.*

Abdel-Fattah, Ahmad M., et al., "Modular Multiplication for Public Key Cryptography on FPGAs," 2009 Fourth International Conference on Computer Sciences and Convergence Information Technology, Nov. 2009, pp. 1096-1100.

Abdel-Fattah, Ahmad M., et al., "Efficient Implementation of Modular Multiplication on FPGAs Based on Sign Detection," 2009 $4^{th}$ International Design and Test Workshop, Nov. 2009, pp. 1-6.

Singh, Karan et al., "System z Crypto and TKE Update," IBM Redbooks, First Edition, May 2011, pp. 1-328.

May, Roger et al., "FPGA Configuration Data Manipulation," IPCOM000009446D, Aug. 26, 2002, p. 80.

Office Action for U.S. Appl. No. 15/440,631 dated May 12, 2017, pp. 1-21.

* cited by examiner

US 9,703,973 B2

CUSTOMER LOAD OF FIELD PROGRAMMABLE GATE ARRAYS

BACKGROUND

One or more aspects relate, in general, to cryptography cards, and in particular, to loading content on field programmable gate arrays of the cryptography cards.

Cryptography cards are used to provide secure communication. One type of cryptography card, offered by International Business Machines Corporation, Armonk, N.Y., is placed in a security enclosure to protect content on the card, including keys used for encryption/decryption of content on the card. The card includes a number of components, including one or more field programmable gate arrays, which are designed to be programmed after manufacture. In one example, the field programmable gate arrays on the secure cards include content loaded by the manufacturer of the cards.

SUMMARY

Shortcomings of the prior art are overcome and additional advantages are provided through the provision of a computer program product for loading field programmable gate arrays. The computer program product comprises a storage medium readable by a processing circuit and storing instructions for execution by the processing circuit for performing a method. The method includes, for instance, loading, by a customer using a processor, customer specific content on a field programmable gate array, the field programmable gate array being located on a secure cryptography card, the secure cryptography card further including a master key generated by the secure cryptography card and used to secure the customer specific content, and wherein, based on the loading, the customer specific content is secure from extraction by at least entities other than the customer.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects, a capability is provided for securely loading customer content (e.g., customer hardware, customer software) on a field programmable gate array (FPGA) located on a secure cryptography card. The customer content includes, for instance, one or more customer proprietary encryption algorithms to be used to encrypt data to improve security within a computer. The customer content is loaded such that it is not extractable by any entity, including, in one embodiment, the customer. In one example, the customer content (and optionally, other content) is encrypted with a customer private key (and possibly other keys, such as an FPGA key). Then, internal to a secure boundary of the cryptography card, one encryption level is removed in which the customer private key is removed and another encryption level is provided by re-encrypting the load with a master key generated by and known only to the cryptography card. Thus, the load, including the customer specific content, is secure from extraction via the master key from any entity. The image is still encrypted with the FPGA key as well. At power-on, the image is loaded in memory, decrypted removing the master key and sent to the FPGA. The FPGA then decrypts the load removing the FPGA key. Thus, actual content of the FPGA is never in the clear until in the FPGA.

Figure 1:
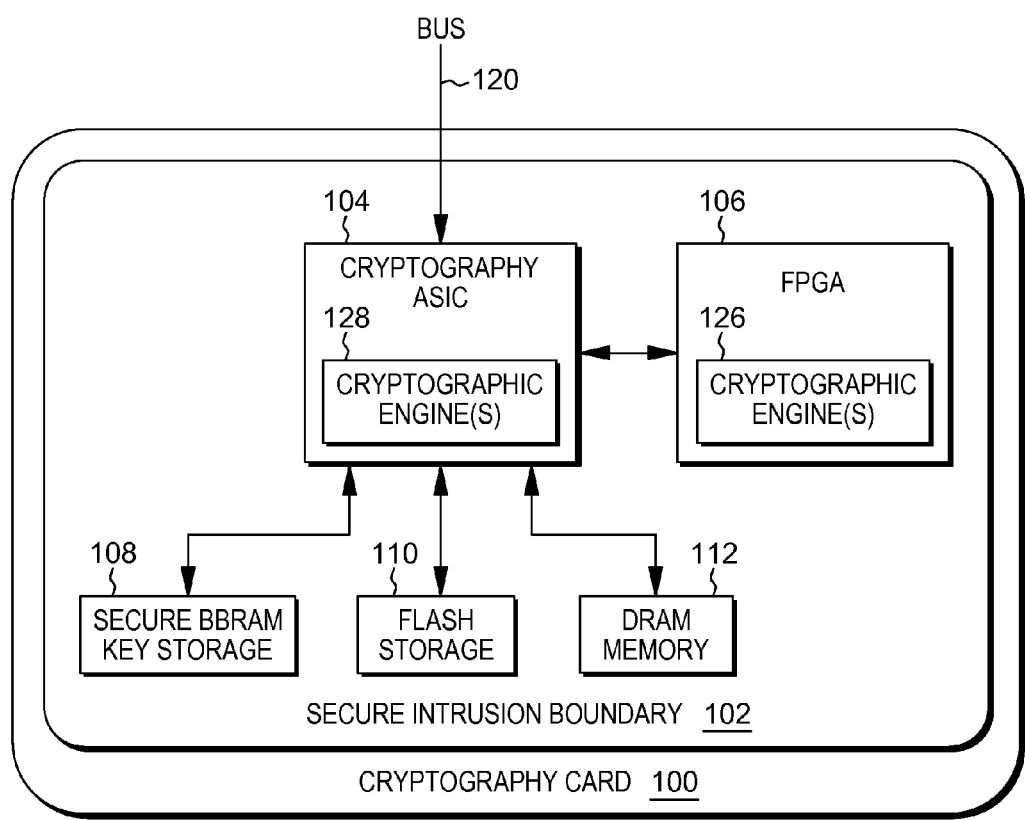
FIG. 1 depicts one example of a cryptography card.

One example of a secure cryptography card (also referred to herein as a card or a crypto card) is described with reference to FIG. 1. Referring to FIG. 1, a cryptography card 100 is, in one particular example, a PCIe (Peripheral Component Interconnect express) card included in an input/output (I/O) subsystem of a data processing system. The card includes a secure intrusion boundary 102 within which a number of components are included. These components, include, for instance, a cryptography application specific integrated circuit (ASIC) 104 coupled to a field programmable gate array (FPGA) 106, as well as to a secure battery backup random access memory (BBRAM) key storage 108, a flash storage 110, and a dynamic random access memory (DRAM) 112. Further, cryptography ASIC is coupled to a bus 120, such as a PCIe bus.

BBRAM 108 maintains one or more keys used for encryption/decryption even when the card is not powered on, and flash storage 110 stores the non-volatile image that is to be loaded at power-on time, as described below. FPGA 106 appears to be a logical extension of ASIC 104. Each of FPGA 106 and ASIC 104 includes one or more cryptographic engines 126, 128, respectively.

Figure 2:
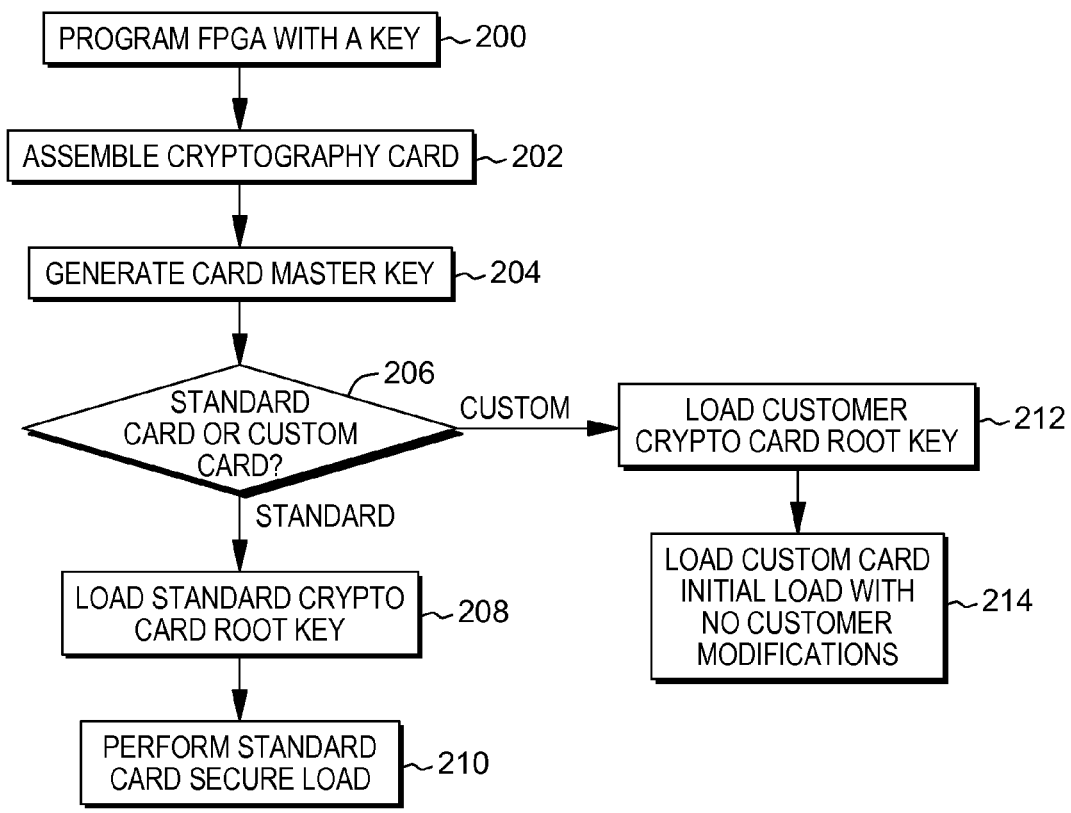
FIG. 2 depicts one embodiment of logic to manufacture a cryptography card, in accordance with one or more aspects.

One embodiment of manufacturing a cryptography card, in accordance with one or more aspects, is described with reference to FIG. 2. Referring to FIG. 2, initially, FPGA 106 is programmed with a key to be used to encrypt a load to be loaded on the FPGA, STEP 200. Subsequent to programming the FPGA with a key (referred to as an FPGA key), the cryptography card to include the FPGA is assembled, STEP 202. The assembling includes placing components on a physical standard printed circuit board and testing those components. Then, in one embodiment, to provide a secure cryptography card, the card is encapsulated in a security boundary.

Thereafter, the security enclosure is enabled, which includes, in one example and in accordance with one or more aspects, generating, by the card, a master key, STEP 204. In particular, each cryptography card generates its own unique card master key known only by the card. This master key is not known to the manufacturer of the card or the customer, and it is not extractable from the card. It is completely secure. In one example, it is generated by a random or pseudo-random number generator, and is generated to meet certain security standards (e.g., NIST (National Institute of Standards and Technology) standards). In one example, the length of the key is also based on the security standards. The card uses that key to locally encrypt content on the card.

A determination is made as to whether the cryptography card is to be a standard card or a custom card for a particular customer, INQUIRY 206. If it is to be a standard card, the card is loaded with a standard root key, STEP 208. Further, a standard card secure load is performed, STEP 210.

Returning to INQUIRY 206, if the card is to be a custom card for a particular customer, then the card is loaded with a custom cryptography card root key, STEP 212. Further, the custom card is initially loaded with a load having no customer modifications, STEP 214. This completes one embodiment of manufacturing a secure cryptography card for a specific customer.

Figure 3:
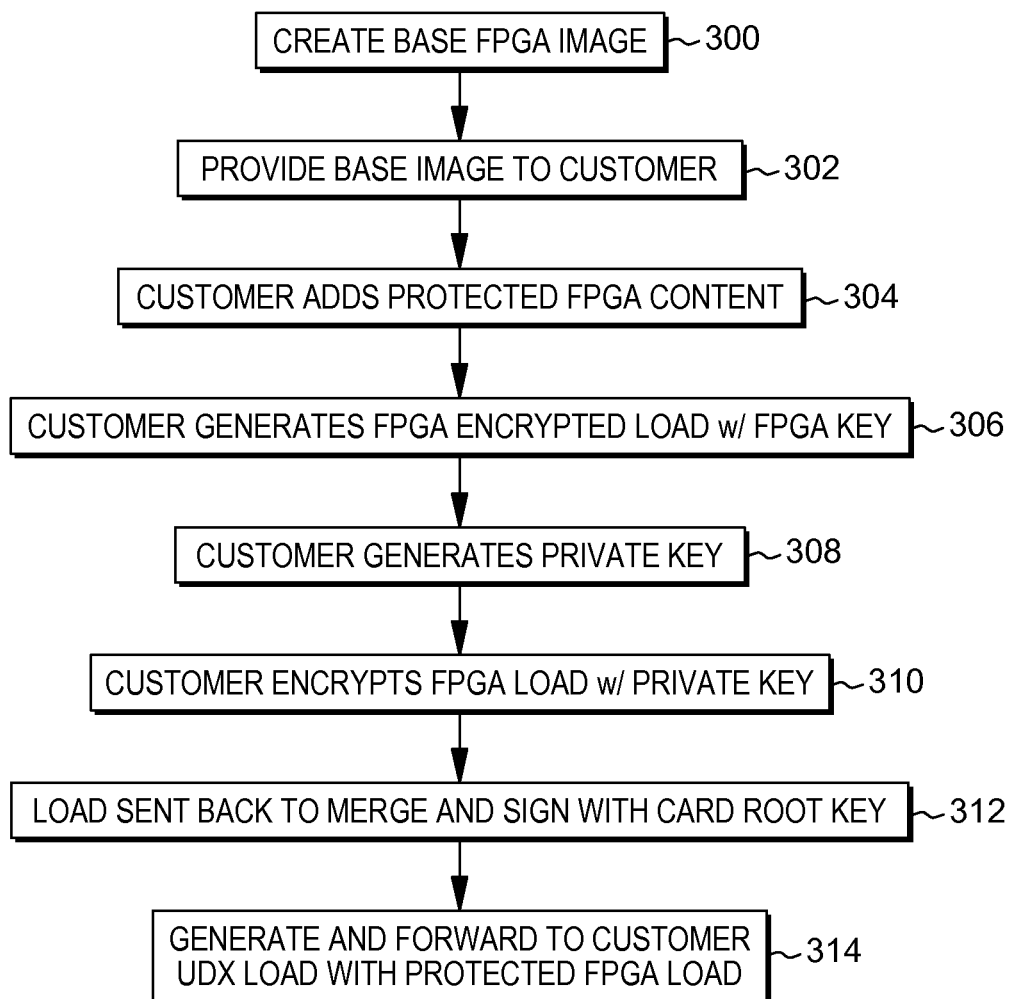
FIG. 3 depicts one embodiment of logic to generate a protected load having customer specific content, in accordance with one or more aspects.

Subsequent to manufacturing a custom cryptography card, in one example, a protected FPGA load is created for the customer, as described in one embodiment with reference to FIG. 3. In one example, a base FPGA image is created by, for instance, the manufacturer of the card or another entity other than the customer, STEP 300. As one particular example, the manufacturer of the card (International Business Machines Corporation in this example) creates the base FPGA image using, for instance, a design tool provided by an entity, such as Altera Corporation, San Jose, Calif., or Xilinx, Inc., San Jose, Calif., as just examples. The base image is provided to the customer, STEP 302. This may be performed a number of ways, including, but not limited to, electronically forwarding the image to the customer or copying the image on a computer readable medium and providing that medium to the customer. Other embodiments may also exist. The customer then adds any desired FPGA content, which is customer specific content, STEP 304. In one example, the FPGA content may be added using the above-referenced design tools. This content is protected, since the processing is performed at the customer's site.

Additionally, the customer encrypts the FPGA content using the assigned FPGA key to provide an FPGA load, which is encrypted, STEP 306. At this point, if this FPGA load was given to the manufacturer or other non-customer entity, that entity could decrypt the contents using the FPGA key, which may be undesirable to the customer. Thus, the customer generates another key that is private and known only to the customer, referred to as a private key, STEP 308. In one example, this key is generated using a random or pseudo-random number generator and is to meet the needs of the encryption algorithm used by the customer and the security standards. The FPGA load is then re-encrypted with the private key, STEP 310. Now, the load is twice encrypted—once with the FPGA key known by one or more entities other than the customer, and again, with the private key known only by the customer.

The FPGA load that has been twice encrypted is then sent back to the manufacturer or other entity, which merges the twice encrypted FPGA load with the remainder of the image software for the cryptography card and the merged load is signed with the card specific root key, STEP 312. Additionally, a user defined extension (UDX) is generated, which is a specific customer modified copy of the merged load, STEP 314. That is, the customer's load is merged with the rest of the firmware and/or software appropriate to the cryptography card, the card is signed with the root key assigned to the card, and integrated into a UDX, since that is what is actually loaded on the card, in this embodiment. The UDX load with the encrypted, protected FPGA load is forwarded to the customer, STEP 314. For example, it may be sent electronically to the customer or provided in another manner.

Figure 4:
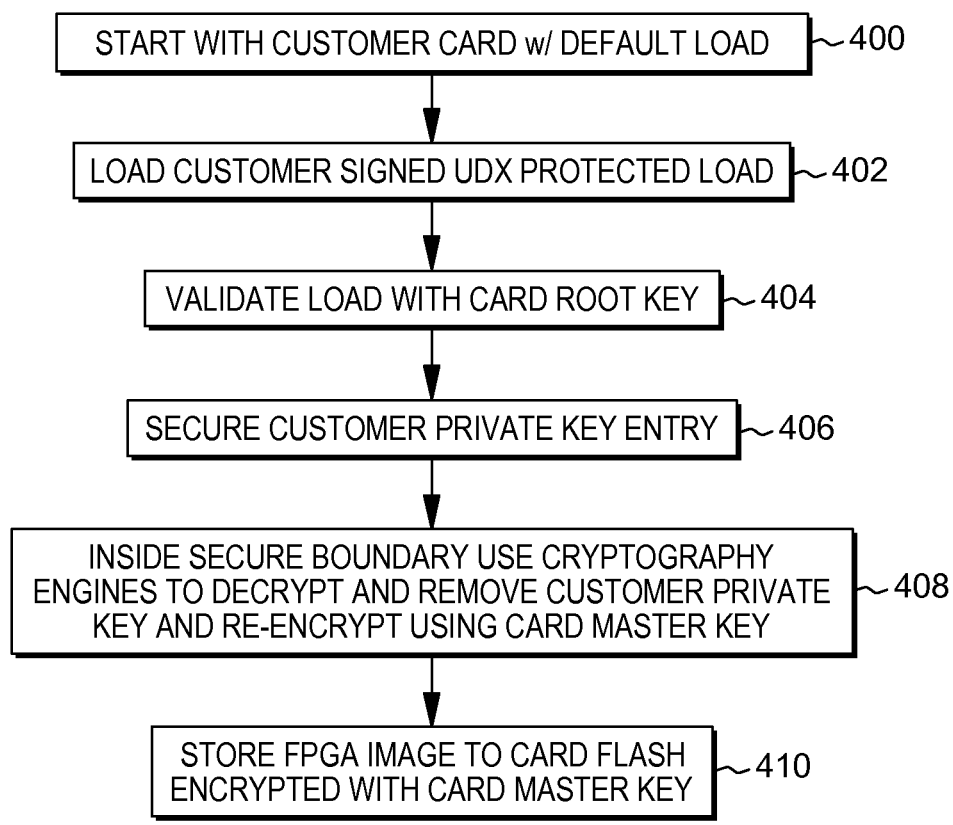
FIG. 4 depicts one embodiment of logic to load the protected load on the cryptography card, decrypt the protected load to remove a private key, re-encrypt the protected load using a master key, and storing an image encrypted with the master key on the card, in accordance with one or more aspects.

Subsequent to the customer obtaining the signed, protected UDX load, the customer configures the custom card, as described with reference to FIG. 4. In one embodiment, the customer starts with a custom cryptography card with a default load absent customer specific content, STEP 400. The customer then loads the properly signed UDX protected load, which includes the customer specific content, STEP 402. The load is validated with the card root key to ensure the image is proper, STEP 404. The customer then has an option to enter the private key to the card via secure techniques, STEP 406. This is performed at the customer's site where the card can be controlled. That is, inside the secure boundary, the image that was sent in as the UDX is stored in flash, and the private key is entered and stored in the BBRAM. While inside the secure boundary, one or more of the cryptographic engines in the ASIC are used to decrypt, using the customer private key, the properly signed UDX protected load to remove the customer private key. Then, one or more cryptographic engines in the ASIC re-encrypt the UDX load with the card unique master key to provide an FPGA image encrypted with the card master key, as well as with the FPGA key, STEP 408.

The FPGA image encrypted with the card master key is then stored in a temporary location, such as the flash storage, STEP 410. Thus, the FPGA image has been encrypted multiple times, and the outer encryption is only known by the customer. The customer will strip off that layer of encryption, and then, re-encrypt it using the card master key that only the card knows. Therefore, an image is created that neither the manufacturer or other non-customer entity nor the customer can see, since only the card knows the master key, which is not extractable.

Figure 5:
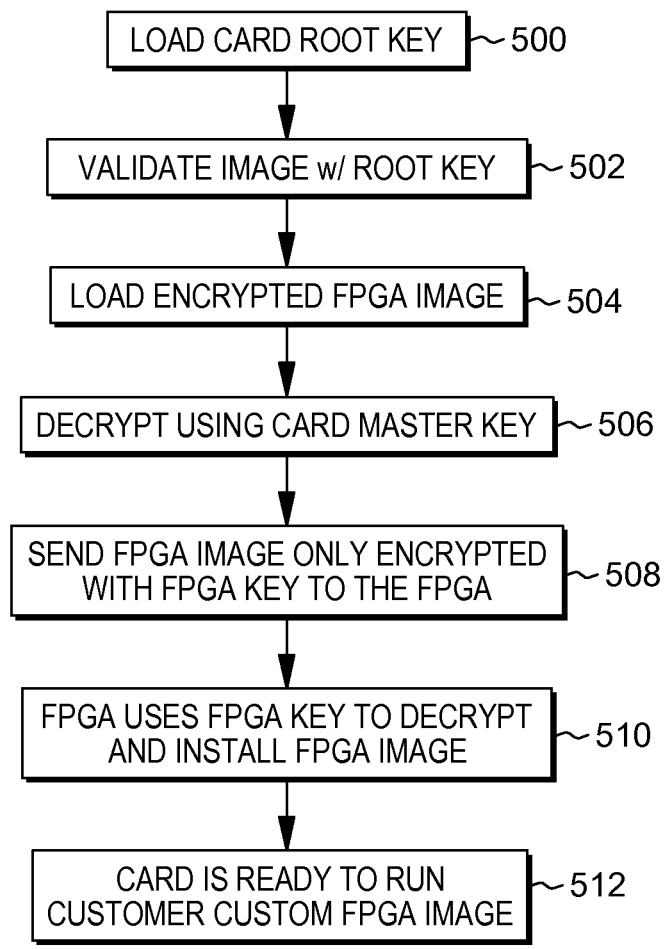
FIG. 5 depicts one embodiment of logic of a power-on sequence for the cryptography card, which includes logic to store an image with customer specific content on a field programmable gate array of the cryptography card, in accordance with one or more aspects.

One embodiment of powering-on a customer specific secure cryptography card is described with reference to FIG. 5. Initially, in one example, when the cryptography card powers on, it loads the card root key, STEP 500. The entire FPGA image has been signed with the root key, so the image is validated with the root key to ensure it has not been modified, STEP 502. Assuming the image is valid, the encrypted FPGA image is loaded into a different temporary location, e.g., the ASIC, STEP 504. For instance, the encrypted FPGA image is sent from the flash storage to the ASIC. Then, within the ASIC, the card master key is used to decrypt the FPGA image, STEP 506. Now, the image of the FPGA is only encrypted by the FPGA key, but that is acceptable, since the image is inside the secure boundary.

The FPGA image encrypted with the FPGA key is then sent over the link from the ASIC to the FPGA, STEP 508. The FPGA uses the FPGA key to decrypt the FPGA image to remove the FPGA key, and installs the decrypted FPGA image within the FPGA, STEP 510. The custom card is then ready to run the customer custom FPGA image, STEP 512.

As described herein, a technique is provided for loading an FPGA within a secure cryptography card with customer specific content in such a manner that neither the customer nor the manufacturer (or other non-customer entity) can decrypt the final image inside the card. The card may be included in a data processing system. Further, a data processing system is capable of implementing one or more of the aspects described above.

Figure 6:
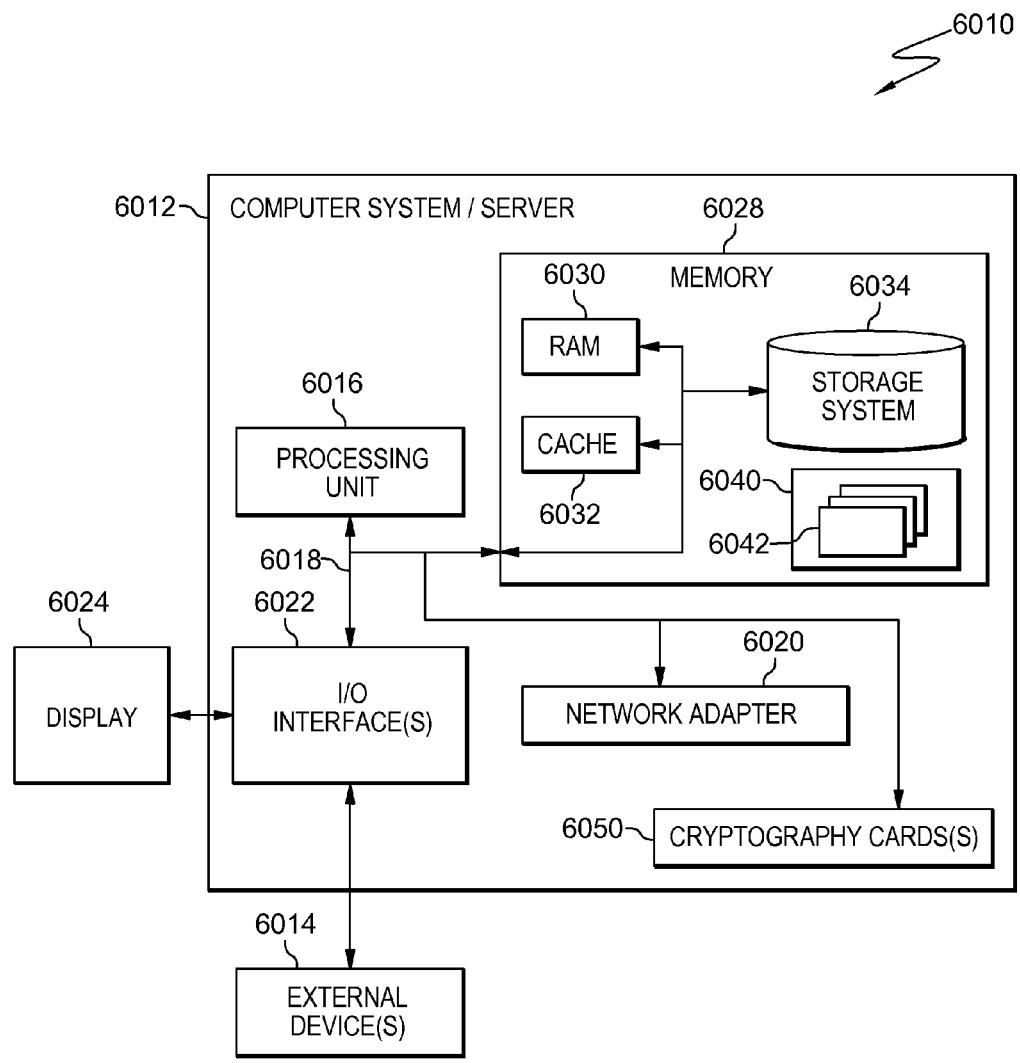
FIG. 6 depicts one embodiment of a data processing system to include the cryptography card and/or execute one or more aspects of the present invention.

Referring to FIG. 6, a schematic of an example of a data processing system 6010 is shown. Data processing system 6010 is only one example of a suitable data processing system and is not intended to suggest any limitation as to the scope of use or functionality of embodiments of the invention described herein. Regardless, data processing system 6010 is capable of being implemented and/or performing any of the functionality set forth herein above. Further, data processing system 6010 may include the secure custom cryptography card.

In data processing system 6010 there is a computer system/server 6012, which is operational with numerous other general purpose or special purpose computing system environments or configurations. Examples of well-known computing systems, environments, and/or configurations that may be suitable for use with computer system/server 6012 include, but are not limited to, micro-controllers, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 6012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 6012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 6012 in data processing system 6010 is shown in the form of a general-purpose computing device. The components of computer system/server 6012 may include, but are not limited to, one or more processors or processing units 6016, a system memory 6028, and a bus 6018 that couples various system components including system memory 6028 to processor 6016. Bus 6018 represents one or more of any of several types of bus structures, including a memory bus or memory controller, a peripheral bus, an accelerated graphics port, and a processor or local bus using any of a variety of bus architectures. By way of example, and not limitation, such architectures include, for instance, the Industry Standard Architecture (ISA), Micro Channel Architecture (MCA), Enhanced ISA (EISA), Video Electronics Standards Association (VESA), and Peripheral Component Interconnect (PCI).

Computer system/server 6012 typically includes a variety of computer system readable media. Such media may be any available media that is accessible by computer system/server 6012, and it includes both volatile and non-volatile media, removable and non-removable media.

System memory 6028 can include computer system readable media in the form of volatile memory, such as random access memory (RAM) 6030 and/or cache memory 6032. Computer system/server 6012 may further include other removable/non-removable, volatile/non-volatile computer system storage media. By way of example only, storage system 6034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 6018 by one or more data media interfaces. As will be further depicted and described below, memory 6028 may include at least one program product having a set (e.g., at least one) of program modules that are configured to carry out the functions of embodiments of the invention.

Program/utility 6040, having a set (at least one) of program modules 6042, may be stored in memory 6028 by way of example, and not limitation, as well as an operating system, one or more application programs, other program modules, and program data.

Each of the operating system, one or more application programs, other program modules, and program data or some combination thereof, may include an implementation of a networking environment. Program modules 6042 generally carry out the functions and/or methodologies of embodiments of the invention as described herein.

Computer system/server 6012 may also communicate with one or more external devices 6014, such as a keyboard, a pointing device, a display 6024, etc.; one or more devices that enable a user to interact with computer system/server 6012; and/or any devices (e.g., network card, modem, etc.) that enable computer system/server 6012 to communicate with one or more other computing devices. Such communication can occur via input/output (I/O) interfaces 6022. Still yet, computer system/server 6012 can communicate with one or more networks, such as a local area network (LAN), a general wide area network (WAN), and/or a public network (e.g., the Internet) via network adapter 6020. As depicted, network adapter 6020 communicates with the other components of computer system/server 6012 via bus 6018. Further, in one example, computer system/server 6012 includes one or more cryptography cards 6050, coupled to bus 6018. At least one cryptography card is a secure card, and in one example, includes the secure customer load.

It should be understood that although not shown, other hardware and/or software components could be used in conjunction with computer system/server 6012. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Described herein is a capability for a customer under UDX to create as many unique FPGA loads as desired and protect the content of those loads from everyone. The capability does not require any hardware design changes to the current ASIC, and protects current cryptography card secrets.

In one or more aspects, an encrypted FPGA load is loaded by a customer without the customer exposing the FPGA content on the cryptography card. A base FPGA design is provided to the customer, as well as a first load. The customer builds one or more full FPGA loads off of the base load. The customer encrypts this binary load file with a standard encryption (e.g., AES (Advanced Encryption Standard) 256) and/or an FPGA encrypted bit stream Customer UDX and card firmware changes are provided that support: customer can provide an encrypted load and key, which is placed such that other protected firmware can access it; the firmware can validate the new FPGA load and install it encrypted with a card unique key in the standard flash storage location; at power-on, the firmware can decrypt on the fly before loading the FPGA, with memory wipe functions; and a design which clears the FPGA content on tamper and can use an encrypted load if required.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. Other embodiments and/or examples may be provided without departing from the spirit of the claims. The encryption/decryption may be performed using any desired encryption algorithm, including but not limited to AES 256, other standard algorithms or proprietary algorithms. Many variations exist.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for loading field programmable gate arrays, the computer program product comprising:
   a non-transitory computer readable storage medium readable by a processing circuit and storing instructions for execution by the processing circuit for performing a method comprising:
      loading, by a customer using a processor, customer specific content on a field programmable gate array, the field programmable gate array being located on a secure cryptography card, the secure cryptography card further including a master key generated by the secure cryptography card and used to secure the customer specific content, and
      wherein, based on the loading, the customer specific content is secure from extraction by at least entities other than the customer;
      wherein loading comprises: loading in a temporary location within the secure cryptography card an encrypted image to be loaded in the field programmable gate array, the encrypted image encrypted with a field programmable gate array key and the master key;
   decrypting the loaded encrypted image using the master key to remove the master key and provide an image encrypted with the field programmable gate array key;
      sending the image encrypted with the field programmable gate array key from the temporary location to the field programmable gate array;
      decrypting the image encrypted with the field programmable gate array key to remove the field programmable gate array key to provide a field programmable gate array image that is decrypted, the decrypting using the field programmable gate array key; and
      installing the field programmable gate array image in the field programmable gate array on the secure cryptography card, the field programmable gate array image including the customer specific content;
   wherein loading further comprises: loading a root key on the secure cryptography card; and
   validating the encrypted image to be loaded in the field programmable gate array using the root key, the validating occurring prior to loading the encrypted image in the temporary location.

2. The computer program product of claim 1, wherein the customer specific content is further secure from extraction by the customer.

3. The computer program product of claim 1, wherein the method further comprises initially providing by an entity other than the customer a base load to be loaded on the field programmable gate array, wherein the field programmable gate array includes customer specific content and other content not specific to the customer.

4. The computer program product of claim 1, wherein the validating comprises validating the encrypted image which is stored in another temporary location within the secure cryptography card, and wherein the method further comprises providing the encrypted image stored in the other temporary location, the providing comprising:
- loading a signed protected load of the customer on the secure cryptography card, the signed protected load being encrypted with a customer private key and the field programmable gate array key;
- decrypting the signed protected load using the customer private key to remove the customer private key;
- re-encrypting the signed protected load using the master key to provide the encrypted image; and
- storing the encrypted image in the other temporary location.

5. The computer program product of claim 4, wherein the loading the encrypted image in the temporary location comprises forwarding the encrypted image stored in the other temporary location to the temporary location.

6. The computer program product of claim 4, wherein the method further comprises obtaining the signed protected load to be loaded on the secure cryptography card, wherein the obtaining comprises:
- obtaining, by the customer, a base image;
- adding, by the customer, the customer specific content to the base image to provide a field programmable gate array content;
- encrypting the field programmable gate array content with the field programmable gate array key;
- encrypting the field programmable gate array content with the customer private key; and
- obtaining the signed protected load, the signed protected load signed with the root key and generated using the field programmable gate array content encrypted with the field programmable gate array key and the customer private key.

7. The computer program product of claim 6, wherein the method further comprises generating the customer private key.

8. A computer system for loading field programmable gate arrays, the computer system comprising:
- a memory; and
- a processor in communications with the memory, wherein the computer system is configured to perform a method, said method comprising:
  - loading, by a customer using the processor, customer specific content on a field programmable gate array, the field programmable gate array being located on a secure cryptography card, the secure cryptography card further including a master key generated by the secure cryptography card and used to secure the customer specific content, and
  - wherein, based on the loading, the customer specific content is secure from extraction by at least entities other than the customer;
  - wherein loading comprises: loading in a temporary location within the secure cryptography card an encrypted image to be loaded in the field programmable gate array, the encrypted image encrypted with a field programmable gate array key and the master key;
  - decrypting the loaded encrypted image using the master key to remove the master key and provide an image encrypted with the field programmable gate array key;
  - sending the image encrypted with the field programmable gate array key from the temporary location to the field programmable gate array;
  - decrypting the image encrypted with the field programmable gate array key to remove the field programmable gate array key to provide a field programmable gate array image that is decrypted, the decrypting using the field programmable gate array key; and
  - installing the field programmable gate array image in the field programmable gate array on the secure cryptography card, the field programmable gate array image including the customer specific content;
  - wherein loading further comprises: loading a root key on the secure cryptography card; and
  - validating the encrypted image to be loaded in the field programmable gate array using the root key, the validating occurring prior to loading the encrypted image in the temporary location.

9. The computer system of claim 8, wherein the validating comprises validating the encrypted image which is stored in another temporary location within the secure cryptography card, and wherein the method further comprises providing the encrypted image stored in the other temporary location, the providing comprising:
- loading a signed protected load of the customer on the secure cryptography card, the signed protected load being encrypted with a customer private key and the field programmable gate array key;
- decrypting the signed protected load using the customer private key to remove the customer private key;
- re-encrypting the signed protected load using the master key to provide the encrypted image; and
- storing the encrypted image in the other temporary location.

10. The computer system of claim 9, wherein the method further comprises obtaining the signed protected load to be loaded on the secure cryptography card, wherein the obtaining comprises:
- obtaining, by the customer, a base image;
- adding, by the customer, the customer specific content to the base image to provide a field programmable gate array content;
- encrypting the field programmable gate array content with the field programmable gate array key;
- encrypting the field programmable gate array content with the customer private key; and
- obtaining the signed protected load, the signed protected load signed with the root key and generated using the field programmable gate array content encrypted with the field programmable gate array key and the customer private key.

11. A computer-implemented method of loading field programmable gate arrays, the computer-implemented method comprising:
- obtaining, by a customer, a field programmable gate array; and
  - loading, by the customer using a processor, customer specific content on the field programmable gate array, the field programmable gate array being located on a secure cryptography card, the secure cryptography card further including a master key generated by the secure cryptography card and used to secure the customer specific content, and wherein, based on the loading, the customer specific content is secure from extraction by at least entities other than the customer;
  - wherein loading comprises: loading in a temporary location within the secure cryptography card an encrypted image to be loaded in the field programmable gate array, the encrypted image encrypted with a field programmable gate array key and the master key;

decrypting the loaded encrypted image using the master key to remove the master key and provide an image encrypted with the field programmable gate array key;

sending the image encrypted with the field programmable gate array key from the temporary location to the field programmable gate array;

decrypting the image encrypted with the field programmable gate array key to remove the field programmable gate array key to provide a field programmable gate array image that is decrypted, the decrypting using the field programmable gate array key; and installing the field programmable gate array image in the field programmable gate array on the secure cryptography card, the field programmable gate array image including the customer specific content;

wherein loading further comprises: loading a root key on the secure cryptography card; and validating the encrypted image to be loaded in the field programmable gate array using the root key, the validating occurring prior to loading the encrypted image in the temporary location.

12. The computer-implemented method of claim 11, wherein the validating comprises validating the encrypted image which is stored in another temporary location within the secure cryptography card, and wherein the method further comprises providing the encrypted image stored in the other temporary location, the providing comprising:

loading a signed protected load of the customer on the secure cryptography card, the signed protected load being encrypted with a customer private key and the field programmable gate array key;

decrypting the signed protected load using the customer private key to remove the customer private key;

re-encrypting the signed protected load using the master key to provide the encrypted image; and storing the encrypted image in the other temporary location.

13. The computer-implemented method of claim 12, wherein the loading the encrypted image in the temporary location comprises forwarding the encrypted image stored in the other temporary location to the temporary location.

14. The computer-implemented method of claim 12, further comprising obtaining the signed protected load to be loaded on the secure cryptography card, wherein the obtaining comprises:

obtaining, by the customer, a base image;

adding, by the customer, the customer specific content to the base image to provide a field programmable gate array content;

encrypting the field programmable gate array content with the field programmable gate array key;

encrypting the field programmable gate array content with the customer private key; and obtaining the signed protected load, the signed protected load signed with the root key and generated using the field programmable gate array content encrypted with the field programmable gate array key and the customer private key.

* * * * *